April 22, 1930.    S. BERNARD ET AL    1,755,532
POULTRY FEEDER
Filed July 22, 1927
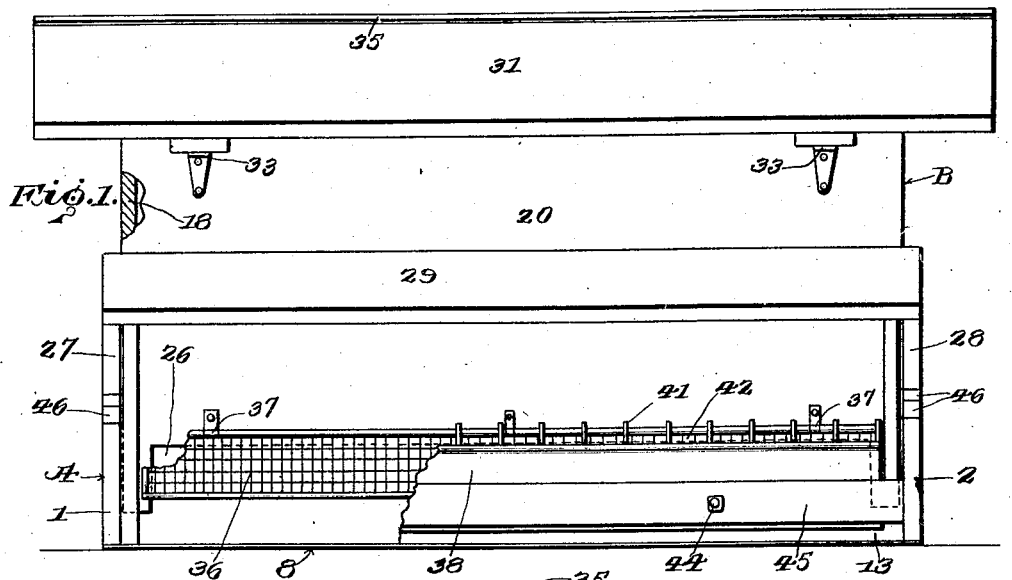
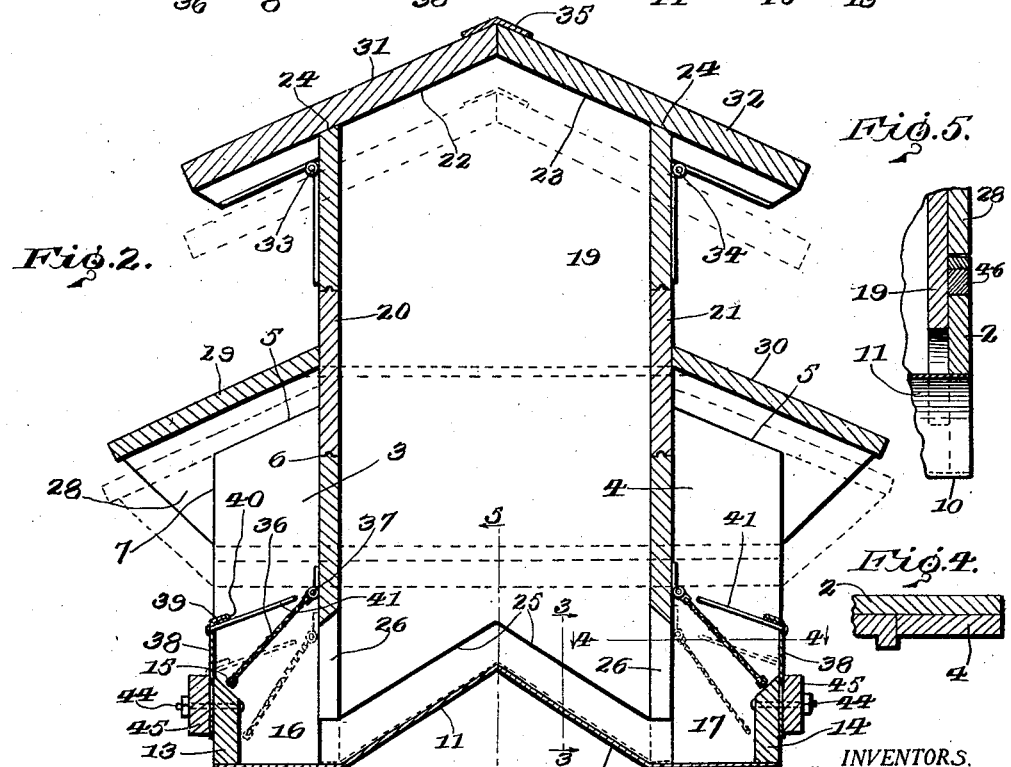
INVENTORS.
S. Bernard and
W. J. Glenn,
BY Geo. P. Kimmel
ATTORNEY.

Patented Apr. 22, 1930

1,755,532

UNITED STATES PATENT OFFICE

STEPHEN BERNARD AND WILLIAM J. GLENN, OF HOLTON, KANSAS

POULTRY FEEDER

Application filed July 22, 1927. Serial No. 207,716.

This invention relates to a poultry feeder, and has for its object to provide, in a manner as hereinafter set forth, a device of such class constructed and arranged to reduce the waste of feed to a minimum.

A further object of the invention is to provide, in a manner as hereinafter set forth, a poultry feeder including a pair of feed troughs and further including new and novel means for varying the supply of feed to the said troughs.

A further object of the invention is to provide, in a manner as hereinafter set forth, a poultry feeder including a pair of feed troughs and further including oppositely extending water-shed boards to prevent water from entering the troughs.

A further object of the invention is to provide, in a manner as hereinafter set forth, a poultry feeder including feed troughs, a removable feed hopper for supplying feed to the troughs, oppositely extending water-shed boards carried by the hopper and acting to prevent water entering the feed troughs, and connections between said boards and which constitute a supporting means for the feed hopper.

A further object of the invention is to provide, in a manner as hereinafter set forth, a poultry feeder including a pair of feed troughs and a hinged foraminous element for positioning upon the top of the body of feed in the trough to prevent the too rapid consumption of the feed by the poultry.

A further object of the invention is to provide, in a manner as hereinafter set forth, a poultry feeder including a pair of feed troughs and an adjustable guard associated with each trough to protect the latter from the poultry and further to form a row of feed openings each adapted for the passage of the head of one fowl for the purpose of feeding from a trough.

A further object of the invention is to provide, in a manner as hereinafter set forth, a poultry feeder including a body section and a bodily shiftable hopper section interengaging with the body section, and with the hopper section readily removable from the body section when it is desired to shift the device.

Further objects of the invention are to provide, in a manner as hereinafter set forth, a poultry feeder which is simple in its construction and arrangement, strong, durable, readily assembled, compact, adjustable, expeditiously disassembled when desired, thoroughly efficient in its use, and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation, partly broken away, looking towards one side of the feeder.

Figure 2 is a vertical sectional view of the feeder and illustrating in full lines the hopper section in an elevated position and in dotted lines in lower position.

Figure 3 is a section on line 3—3 Figure 2.

Figure 4 is a section on line 4—4 Figure 2.

Figure 5 is a section on line 5—5 Figure 2.

A poultry feeder in accordance with this invention includes a body section referred to generally at A and a hopper section referred to generally at B. The hopper section B is extended into the body section 1, interengages therein, free of direct connection therewith, vertically adjustable, and conveniently removed from the body section when desired.

The body section A includes a pair of spaced end members 1, 2 which are rectangular in contour, stand on edge and are of appropriate height. Secured to the inner face of each of said end members and flush with each end edge and the bottom edge thereof is a vertically disposed hopper retaining and guide member of a height to project a substantial distance above the end member. Each hopper retaining and guide member is of a width materially less than the length of an end member and has the inner side edge thereof positioned at a point removed from the vertical median of an end member. The hopper retaining and guide members which are secured to the inner face of each end member are indicated at 3, 4. The top edge 5 of each hopper retainer and guide member inclines downwardly from its inner side to the outer side edge 6. The inner side edges 6 of the members 3, 4 provide opposed shoulders spaced a substantial distance from each other and provide means for retaining and guiding the hopper section B which will be hereinafter referred to.

The body section A further includes a bottom member referred to generally as 8 and constructed of sheet metal of the desired gauge. The bottom member 8 is formed with a pair of flattened end parts 9, 10 and an intermediate, upstanding inverted V-shaped part 11 providing a pair of oppositely extending and downwardly inclined slideways for the feed which will be hereinafter referred to.

The bottom edge of each end member is shaped to conform to the contour of the bottom member 8, and the latter has its side marginal portions secured to the bottom edges of the end members 1, 2. The inner side edges 6 of the members 3, 4 are spaced from the lower ends of the slideways provided by the intermediate part 11 of the bottom 8 and the latter is also secured against the bottom edges of the members 3, 4. The bottom 8 can be of any width desired, and has its end edges flush with the end edges of the end members 1, 2. The inverted V-shaped part of the bottom edge of each end member is indicated at 12.

The body section further includes a pair of side bars 13, 14 standing on edge and the bar 13 extends from one member 3 to the other member 3 and the bar 14 extends from one member 4 to the other member 4. The side bars 13, 14 are of less height than the end members 1, 2 and the top edge of each of said side bars is inwardly beveled as at 15. The end marginal portions of the bottom member 8 are secured against the bottom edges of the side bars 13, 14. The parts 9, 10 of the bottom member 8, in connection with the hopper retaining and guide members 3, 4 and the side bars 13, 14, provide feed troughs 16, 17 which are oppositely disposed with respect to each other.

The hopper section is of a length to extend from the end member 1 to the end member 2 and of a width to extend from the members 3 to the members 4. The hopper section B rides against the shoulders formed by the inner side edges of the members 3, 4 and also rides against the inner faces of the end members 1, 2. The members 3, 4 constitute combined retaining and guiding means for the hopper section B. The hopper section B includes a body portion of rectangular contour in plan and which consists of a pair of spaced side walls and a pair of spaced end walls. The end walls are indicated at 18, 19 and the side walls at 20, 21. The top edge of each end wall is oppositely inclined as indicated at 22, 23. The top edge of each side wall is bevelled as at 24 and which forms a continuation of the inclined top edge of the end walls. The intermediate part of the bottom edge of each end wall is of inverted V-shape, as indicated at 25 and conforms in contour to the intermediate part 11 of the bottom member of the body section A. The lower portion of each side wall is formed with a rectangular opening 26 of a length less than the length of the wall. The openings 26 provide outlets for the feed from the hopper section.

The hopper section when in its lowermost position is seated on the upper face of the bottom member 8, that is to say upon the inner portion of the parts 9, 10 and upon the intermediate part 11 of the bottom member, and said hopper section when in such position, is also supported from the top edges of the end members 1, 2 of the body section A. For the purpose of supporting the hopper section on the end members 1, 2 it is provided with a pair of holder members 27, 28 which extend transversely of the end walls 18, 19, or spaced therefrom, as well as being of greater length than the width of said end walls 18, 19. The holder members 27, 28 are positioned above the lower end of the body portion of the hopper. The holder members 27, 28 are carried by a pair of oppositely disposed, downwardly inclined water shed members 29, 30 which are secured to the outer faces of the side walls 20, 21 of the body portion of the hopper section, are of greater length than the length of such walls and of a width to project beyond the ends of the end members 1, 2 of the body section A. The water shed members 29, 30 incline in a direction corresponding to the inclination of the top edges of the members 3, 4 and seat on these latter when the hopper section B is in its lowermost position.

The lower end of the body portion of the hopper section is open and the upper end is normally closed by a removable, hinged, sectional closure or top which consists of a pair of oppositely disposed, inclined sections 31, 32, the former being hinged to the wall 20, as at 33 and the latter being hinged to the wall 21 as at 34. The pivot of each hinge connection is arranged below the top edge of a side wall of the body portion of the hopper section. The sections 31 and 32 seat upon the beveled top edges of the walls 20, 21 when the upper end of the body portion of the hopper section is closed. The sections 31, 32 when in closure position with respect to the body portion of the hopper section B, project laterally not only from the side walls 20, 21 but also from the end walls 18, 19 of the body portion of the hopper section. The sections 31, 32 when in closure position with respect to the body portion of the hopper section, abut against each other at their inner side edges and the joint therebetween is closed by an inverted V-shaped strip 35 of metallic material, which is carried by the section 32 and overlaps and seats on the section 31 when the said sections 31, 32 are seated on the end walls and side walls of the hopper section. The top structure is claimed in our application No. 207,717, filed July 22, 1927.

Hinged to the outer face of each side wall of the body portion of the hopper section is a foraminous member or element 36, and the hinged connection between it and a side wall is indicated at 37. Each of the foraminous elements 36 is of a length slightly greater than either of the openings 26 and of a width to extend in close proximity to a side bar 13 or 14 of the body section A. The foraminous elements 36, which are in the form of screens, of suitable mesh, rest on the top of the feed which is supplied to the troughs 16, 17 and prevent the fowls from too rapidly consuming the feed. When the hopper section B is adjusted the foraminous elements 36 are carried therewith and as shown in Figure 2 two positions of the foraminous elements are illustrated. The adjusting of the hopper section B controls the supply of feed therefrom into the troughs 16, 17 and the elements 36 also assist in this action.

Adjustably connected to each side bar of the body section A, is a guard device which comprises a rectangular plate 38 of sheet metal having an inturned flange 39 at its top formed with a rounded inner edge 40. Connected to and extending through the plate 38 and abutting against the flange 40 is a series of spaced inwardly extending bars 41 which provide feed openings 42 for the passage of the head of the fowl for the purpose of feeding. The bars 41 are arranged over the elements 36 and have their inner ends terminate at a point removed from said elements 36. Each plate 38 is positioned against the outer face of a side bar and extends thereabove. Each plate 38 extends from a point in close proximity to the inner faces of a pair of opposed hopper retaining and guide members. Each plate 38 is formed with a series of vertical slots 43 through which extend holdfast devices 44 for fixedly securing the plate in adjusted position. Positioned against the outer face of the plate 38 is a retaining bar 45 through which extend the holdfast devices 44. Each of the holdfast devices consists of a headed bolt provided with a nut at its outer end and with the nut abutting against a retaining bar or member 45.

The elements 36, in connection with the guard devices reduce waste of feed to a minimum.

For the purpose of adjusting the hopper section B, there is provided a series of adjusting rods arranged in sets. One set coacts with the top edge of the end member 1 and the other set coacts with the top edge of the end member 2. Each set of adjusting rods is indicated at 46 and each set, or one of the bars of each set, is interposed between an end member of the body section A and a holder 27 or 28. When the adjusting bars are employed the outlet for the feed from the hopper section is increased due to the fact that the hopper section B is spaced above the bottom member 3 of the body section A, as illustrated in full lines in Figure 2. The more adjusting bars are used, the higher will be the hopper section B relative to the body section A.

The body section A is free of connection with the hopper section B, whereby when desired the hopper section can be expeditiously removed from the body section A. When the hopper section B is adjusted relative to the body section A, the guard devices are also adjusted. The positions of the elements 36 are changed on the adjustment of the hopper section B.

It is thought the many advantages of a poultry feeder, in accordance with this invention, can be readily understood, and although the preferred embodiments of the invention are as illustrated and described, yet it is to be understood that changes in the details of construction can be had which will fall within the scope of the invention as claimed.

What we claim is:

1. A poultry feeder comprising a body section formed with a pair of oppositely disposed feed troughs and vertically extending, opposed, spaced combined hopper retaining and guide members, a hopper section slidably positioned between said members and discharging in said feed troughs, retaining screens hinged to said hopper for positioning upon the feed within the troughs, and a guard device connected to each of the troughs and overlapping said screens.

2. A poultry feeder comprising a body section formed with a pair of oppositely disposed feed troughs and vertically extending, opposed, spaced combined hopper retaining and guide members, a hopper section slidably positioned between said members and discharging in said feed troughs, retaining screens hinged to said hopper for positioning upon the feed within the troughs, a guard device connected to each of the troughs and overlapping said screens, and means for vertically adjusting said guard devices.

3. In a poultry feeder, a body section formed with a pair of oppositely disposed feed troughs, a bodily shiftable, vertically disposed hopper section slidably arranged within said body section between and discharging into said troughs, a pair of spaced, vertically extending, endwise opposed elements secured to the inner face of each end of the body section, abutting the sides of the hopper and providing combined retainers and guides for the latter, said body section including a bottom member formed with an inverted V-shaped, upstanding intermediate portion, and said hopper section including side and end walls, said end walls having the bottom edges thereof formed with upstanding inverted V-shaped parts for overlapping and abutting said intermediate part of the bottom member.

4. In a poultry feeder, a body section formed with a pair of oppositely disposed feed troughs, a bodily shiftable, vertically disposed hopper section slidably arranged within said body section between and discharging into said troughs, means carried by the body section for retaining and guiding said hopper section, foraminous feed retainers hinged to the side walls of the hopper section for seating on the top of the feed within the troughs, and guard devices connected to the troughs and including means to provide feed openings arranged over and spaced from said retainers.

5. A poultry feeder comprising a body section having a pair of spaced feed troughs, a vertically adjustable feed hopper section extending into said body section and discharging into said troughs, spaced, opposed, combined hopper section retaining and guide members secured to the inner face of the ends of said body section and abutting the sides of said hopper section, and means interposed between said sections for selectively positioning the hopper section at various heights with respect to the body section.

6. A poultry feeder comprising a body section having a pair of spaced feed troughs, a vertically adjustable feed hopper section extending into said body section and discharging into said troughs, combined hopper section retaining and guide members secured within said body section and abutting said hopper section, foraminous feed retaining elements hinged to the hopper section and adapted to be seated upon the top of the feed within the troughs, and guard devices carried by and extending upon said troughs and including inwardly disposed means providing feed openings positioned over and spaced from said elements.

7. A poultry feeder comprising a body section having a pair of spaced feed troughs, a vertically adjustable feed hopper section extending into said body section and discharging into said troughs, combined hopper section retaining and guide members secured within said body section and abutting said hopper section, means interposed between said sections for selectively positioning the hopper section at various heights with respect to the body section, foraminous feed retaining elements hinged to the hopper section and adapted to be seated upon the top of the feed within the troughs, and guard devices carried by and extending upon said troughs and including inwardly disposed means providing feed openings positioned over and spaced from said elements.

8. In a poultry feeder of the type including a feed trough, a guard device including a vertically disposed plate for connection to the outer side wall of the trough, said plate extending above said wall and formed at its top with an inwardly extending flange having a rounded free side edge, and spaced bars secured to and extending through said plate and abutting the lower face of said flange and providing feed openings.

9. In a poultry feeder a rectangular open top body section provided at each end with a feed trough, a removable rectangular feeder hopper free of connection to and extending into said body section between said troughs, said hopper having an open bottom and an outlet in each of its sides at the lower end thereof, said hopper being bodily removable from the body section, and a pair of spaced, vertically extending, endwise opposed elements secured to the inner face of each end of the body section, abutting the sides of the hopper and providing combined retainers and guides for the latter.

10. In a poultry feeder a body section formed at its bottom with a pair of oppositely disposed feed troughs, a bodily shiftable, vertically disposed hopper section slidably extending at its lower portion into said body section and discharging into said troughs, and a pair of spaced, vertically extending, sidewise opposed elements secured to the inner face of and projecting above each end of the body section, abutting the sides of the hopper section and providing combined retainers and guides for the latter.

11. In a poultry feeder of that type including feed trough and a feed hopper discharging into the troughs, the combination of a pair of oppositely extending, downwardly inclined water-shed boards adapted to be secured at their inner edges to opposite sides of the hopper and protecting the feed trough from water, said boards projecting beyond the ends of the hopper, and a pair of vertically disposed, holder members opposing and spaced outwardly from the ends of the hopper and secured at spaced portions of their tops to the ends of said boards for connecting the boards together and providing a supporting means for the hopper at each end thereof.

In testimony whereof, we affix our signatures hereto.

STEPHEN BERNARD.
WILLIAM J. GLENN.